(12) United States Patent
Weidman

(10) Patent No.: US 8,329,261 B2
(45) Date of Patent: Dec. 11, 2012

(54) MARINE ANTIFOULANT COATING

(76) Inventor: Larry Weidman, Overland Park, KS (US)

(*) Notice: Subject to any disclaimer, the term of this patent is extended or adjusted under 35 U.S.C. 154(b) by 178 days.

(21) Appl. No.: 12/724,934

(22) Filed: Mar. 16, 2010

(65) Prior Publication Data

US 2010/0173097 A1    Jul. 8, 2010

Related U.S. Application Data

(62) Division of application No. 11/778,193, filed on Jul. 16, 2007.

(51) Int. Cl.
*H05H 1/24* (2006.01)

(52) U.S. Cl. ......... 427/569; 523/122; 524/413; 427/570

(58) Field of Classification Search ............... 427/447, 427/453, 570, 446; 523/122; 524/413; 219/121.47
See application file for complete search history.

(56) References Cited

U.S. PATENT DOCUMENTS

| 5,225,655 | A  | * | 7/1993 | Muehlberger | ........... 219/121.47 |
| 2005/0048218 | A1 | * | 3/2005 | Weidman | ..................... 427/446 |

* cited by examiner

*Primary Examiner* — Nicole M Buie-Hatcher
(74) *Attorney, Agent, or Firm* — Hovey Williams LLP

(57) ABSTRACT

A protective coating applied to the underwater portion of a marine vessel operable to inhibit the growth of marine foulants. The coating comprises a polymer, a marine biocide, a preservative, and optionally an antimicrobial agent. In certain embodiments, the marine biocide, preservative, and optional antimicrobial agent are chemically bonded with the polymer thereby significantly reducing the ability of the biocide, preservative, and antimicrobial agent to leach from the coating into the surrounding environment.

5 Claims, No Drawings

US 8,329,261 B2

MARINE ANTIFOULANT COATING

RELATED APPLICATIONS

The present application is a divisional patent application and claims priority benefit, with regard to all common subject matter, to earlier-filed U.S. non-provisional patent application entitled "MARINE ANTIFOULANT COATING", Ser. No. 11/778,193, filed Jul. 16, 2007. The identified earlier-filed patent application is incorporated in its entirety into the present application by reference.

BACKGROUND OF THE INVENTION

1. Field of the Invention

Embodiments of the present invention relate to a coating that is applied to a surface. More particularly, embodiments of the present invention relate to a protective coating that is applied to the underwater portion of a marine vessel so as to inhibit the growth of marine foulants.

2. Description of the Related Art

Marine vessels that reside in a water environment over certain lengths of time can accumulate biological growth, known as foulants, on those surfaces that are in contact with the water. Diverse species of hard and soft fouling organisms, such as barnacles, zebra mussels, algae, and slime, form colonies on the underwater surfaces of the vessel, particularly when a vessel is docked, because each requires a permanent anchorage in order to mature and reproduce. Marine growth fouling adds weight to a ship, increases the amount of fuel consumed, and reduces its speed.

Historically, to combat the growth of marine foulants, the underwater surfaces of ships have been coated with antifoulant paints, which often include toxic materials to inhibit biological growth. The antifoulant paints may degrade and break down over time, releasing the toxic materials from the marine vessel into the surrounding water. These toxic materials may include volatile organic compounds (VOCs) and hazardous air pollutants (HAPs). The International Maritime Organization and the United States Environmental Protection Agency have enacted regulations and standards that restrict the emission of VOCs and HAPs from antifoulant paints. The decomposition and break down of the antifoulant paint results in reduced efficacy of the protection afforded by the antifoulants, thereby requiring reapplication of the paint in a relatively short time. Thus, a coating material is required that can be applied to the underwater surfaces of a marine vessel which repels the growth of fouling organisms on such surfaces and has an extended lifetime without releasing significant amounts of toxic materials into the environment.

SUMMARY OF THE INVENTION

Embodiments of the present invention solve the above-mentioned problems and provide a distinct advance in the art of coatings applied to a surface. More particularly, embodiments of the invention provide a protective coating applied to the underwater portion of a marine vessel operable to inhibit the growth of marine foulants. Furthermore, the coating does not degrade significantly over time which leads to a longer effective lifetime and a greatly reduced emission of toxic materials as compared with conventional antifoulant paints.

Various embodiments of the present invention provide an antifoulant coating comprising a polymer that adheres to a surface of a marine vessel that contacts water, a preservative and a marine biocide. In certain embodiments, the preservative and marine biocide are chemically bonded to the polymer so as to prevent leaching of the preservative and/or biocide into the surrounding marine environment.

In another embodiment, a method of forming a marine antifoulant coating is provided. The method comprises forming a mixture comprising particles of a polymer, a marine biocide, and a preservative. The mixture is heated to a temperature above the glass transition temperature of the polymer thereby forming a flowable mixture comprising the polymer having particles of the biocide and preservative dispersed therein. A variable electric field is applied to the heated mixture to alter the orientation of the polymer and the particles of biocide and preservative relative to each other.

In yet another embodiment, a method of applying a marine antifoulant coating to a surface of a marine vessel is provided. The method comprises injecting a heated blended mixture comprising a polymer, a marine biocide, and a preservative into a plasma stream. The plasma stream and heated blended mixture are enshrouded with a shielding gas to prevent contamination of the heated blended mixture. The plasma stream and heated blended mixture are directed onto the marine vessel surface whereby the heated blended mixture becomes adhered to the surface.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the preferred embodiments.

DETAILED DESCRIPTION OF THE PREFERRED EMBODIMENTS

The embodiments illustrated in the following detailed description are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

The coating is generally operable to inhibit the growth of marine fouling organisms on the underwater portion of a marine vessel by repelling the marine organisms when they contact the coating. In various embodiments, the coating also reduces the ability of fouling organisms to adhere to the coated marine vessel surface. Some growth of organisms on the coating may occur, particularly when the vessel is idle, but the organisms detach and slough off as the vessel begins moving through the water. The coating prevents the fouling organisms from strongly adhering to the marine vessel so that the motion of water across the surface of the coating serves as a rinsing action to clean the surface of any fouling growth.

In various embodiments, the coating comprises a polymer, a marine biocide, and a preservative. In other embodiments, the coating further comprises an antimicrobial agent.

The polymer component serves as a foundation for the antifoulant coating in which the other components of the coating are dispersed. Without desiring to be bound by any particular theory, it is believed that the polymer functions as a matrix to which the other components are chemically bonded. Furthermore, it is believed that the preservative and marine biocide may be covalently bonded to the polymer, although certainly it is within the scope of the invention for these bonds to be of an ionic nature as well.

In any event, the polymer binds the preservative and marine biocide in the coating and helps to retain them against the target surface, such as the hull of a ship. The polymer may be a polyamide including various types of nylon such as nylon 11 or nylon 12, available under the name VESTOSINT® by Degussa of Dusseldorf, Germany. The polymer may also be an impact resistant powder coating resin, such as SURLYN® (ionomer), ABCITE® X60 or ABCITE® X70 by DuPont of Wilmington, Delaware. In various embodiments, the listed polymers may be polar in nature. Generally, the polymer presents the characteristics of increased adhesion to various substrates (particularly metal), high impact resistance, and high resistance to degradation.

In various embodiments, the polymer may also include a fluoropolymer, such as polytetrafluoroethylene (PTFE), perfluoroalkoxy polymer resin (PFA), polyethylenetetrafluoroethylene (ETFE), or polyvinylidene fluoride (PVDF), or powdered silicone in combination with any of the polymers listed above. It is possible that the listed components are non-polar. These additive components are typically included to decrease the coefficient of friction of the antifoulant coating and would primarily be used in situations where the vessel is faster moving, thereby benefiting from a decreased drag on the ship.

Generally, the polymer is supplied in a powder form having average particle sizes ranging from about 20 microns (μm) to about 80 μm. In other embodiments, the polymer may be supplied in a nano-sized form wherein the average particle size is between about 25 nanometers (nm) to about 40 nm.

The polymer typically presents a glass transition temperature that is lower than the melting point of the other components included in the antifoulant coating. Thus, the polymer enters the glass transition phase and bonds with the other components before the other components begin to melt. Thus, the marine biocide and preservative are present as discrete particles dispersed within the polymer matrix. Additionally, the polymer is compatible with the target surface so as to adhere strongly thereto once applied. The glass transition temperature of the polymer may be within the range of about 176° F. to about 248° F.

The marine biocide generally comprises a metal component such as copper or silver. Biocides containing metal components are well known in the art. The biocide may be supplied as copper oxide (also known as cuprous oxide or $Cu_2O$), copper and silver coated hollow micro spheres, silver and copper-clad mica flake, or AgION™ antimicrobial by Agion of Wakefield, Mass. Copper oxide is widely used and is available in several grades, Red Copper 97, Premium grade Purple 97N, and Lo-Lo Tint 97N. However, the marine biocide may comprise any single component listed or combinations thereof. The marine biocide may also include other conventional biocide components, preferably in powder form, that can bond with the polymer.

The marine biocide may be supplied in a micro-sized form, wherein the average particle size is from about 40 μm to about 60 μm, or a nano-sized form, wherein the average particle size is from about 25 nm to about 35 nm. As noted above, the biocide can continue to exist as a plurality of discrete particles dispersed within the polymer matrix once formed into the coating composition.

The preservative may comprise VANCIDE® 89, by R. T. Vanderbilt Company, Incorporated of Norwalk, Conn. The preservative is generally included to protect the polymer from degradation and breakdown due to bacterial growth. The preservative may also include other preservative components that can be supplied in a powder form and can bond with the polymer.

Generally, the preservative may be provided in a micro-sized form, wherein the average particle size is from about 20 μm to about 80 μm, or a nano-sized form, wherein the average particle size is from about 25 nm to about 40 nm.

In various embodiments, the antifoulant coating may also include an antimicrobial agent, such as IRGAGUARD® (triclosan) or IRGAROL® by Ciba of Tarrytown, N.Y., indium oxide or indium-tin oxide by Indium Corporation of Utica, N.Y., and NANOKLEAN™ by Envont Technologies of Chesterfield Township, Mich. The antimicrobial agent may be included to provide additional protection against microbial growth that could cause staining or degradation of the antifoulant coating or that could lead to the growth of larger organisms. Typically, as the level of the antimicrobial is increased, the level of the preservative is decreased. Thus, there is a tradeoff between additional prevention of foulant growth and preservation of the polymer. The antimicrobial may be added depending on the characteristics of the water in which the vessel is anticipated to reside primarily. Furthermore, the antimicrobial agent is generally provided in a blendable powder form and is capable of bonding with the polymer.

It is possible that one or more of the polymer, the marine biocide, the preservative, and optionally the antimicrobial agent may present a net positive or negative electrical charge in order to aid with bonding of the components. It is also possible that the above components may present polar regions as opposed to a full charge.

In various embodiments, the antifoulant coating comprises from about 40% to about 70% by weight of the polymer, from about 37% to about 55% by weight of the marine biocide, and from about 2% to about 12% by weight of the preservative. When present, the antimicrobial agent is present at a level of from about 2% to about 8% by weight. Also when present, the additive fluoropolymer or silicone powder is present at a level of from about 10% to about 20% by weight. These components are generally supplied in a powder form with a particle sizes as described above. The polymer, the marine biocide, the preservative, and optionally the antimicrobial agent and fluoropolymer or silicone powder are mixed in a blender to yield a uniform powder material. The blender may be cooled to prevent overheating and coagulation of the mixture.

An exemplary mixture is created as follows. The polymer component comprises 47.5 pounds of polar polyamide nylon that has been precipitated in the form of round-shaped particles (50 micron particle size). The marine biocide component comprises 52.5 pounds of red cuprous oxide 97N premium grade (50 micron particle size), and the preservative component comprises 6 pounds of Vancide® 89 (50 micron particle size). The above components are placed in a water jacket-cooled Henschel blender and mixed at 3600 rpm for two minutes.

Next, the mixture is heated to a temperature sufficient to exceed the glass transition temperature of the polymer, and perhaps even the melting point of the polymer, but not great enough to melt the other components. Generally, the mixture is heated to between about 220° F. and about 275° F. Thus, the polymer becomes flowable and can bond with the other components. Generally, the biocide and preservative do not bond with each other, but instead are dispersed within the polymer matrix. In certain embodiments, the components comprising the antifoulant coating form bonds with each other to produce a three-part structure, and in embodiments also comprising an antimicrobial agent, a four-part structure. In each instance, the biocide, preservative, and optional antimicrobial agent bond or interact directly with the polymer as opposed to each other.

The mixture may also be exposed to a variable electric field in which the components may have their radial velocity adjusted, be separated, reoriented, or otherwise manipulated in order to maximize the percentage of material that forms a three-part (or four-part) bonded structure. The variable electric field is generally applied to a confined space, such as a chamber through which the material passes, so that the motion of the components may be precisely controlled. For example, the electric field may be applied to the chamber so that the polymer is physically aligned in the proper orientation with the marine biocide, the preservative, and, optionally the antimicrobial to form the three or four-part bonded structure.

Once the mixture is heated, the coating is injected into a plasma stream that is surrounded by a shielding gas to prevent contamination of the coating during transport to the target surface. The temperature of the coating must be maintained at or above the glass transition temperature of the polymer until the coating impacts the target surface (i.e., a portion of the surface of a marine vessel). However, if the coating becomes too warm, the bonds between the polymer and the other components may break thereby leading to the decomposition of the coating. Excessive temperatures may also lead to the formation of bonds between the marine biocide, the preservative, and/or the antimicrobial thereby minimizing the effectiveness of the coating to prevent foulant growth. Further, if the coating cools before impacting the surface, its ability to adhere to the surface may be adversely affected. The coating may not evenly adhere to the surface thereby decreasing the lifetime of the coating.

In various embodiments, the coating may be applied to a primer coating comprising only the polymer if the target surface has some chemical or physical characteristics or possibly contaminants that may affect the adherence of the coating. A polymer primer coat generally increases the adherence of the antifoulant coating to the target surface.

In various embodiments, the resulting mixture is applied to a target surface using a high-velocity impact fusion plasma spray gun apparatus, such as the one disclosed in U.S. patent application Ser. No. 11/758,991, filed Jun. 6, 2007, which is herein incorporated by reference. For use with the plasma spray gun apparatus, the mixture is placed into a bin or hopper that is capable of supplying the mixture in a pressurized form to the spray gun, wherein the mixture is transformed into the antifoulant coating that is ready to be applied to a surface.

An exemplary copper-containing coating was tested following the procedure of ASTM International (formerly American Society of Testing and Materials) standard number D6442-05 "Standard Test Method for Determination of Copper Release Rate From Antifouling Coatings in Substitute Ocean Water" over the course of 90 days. Essentially, the test method determines the rate at which copper is released from an antifouling coating in substitute ocean water.

Three samples were prepared and tested using the following procedure. A cylinder approximately 2.5 inches in diameter and 7.125 inches in length, that is designed for the purpose of testing coatings, was coated on the lower portion of the outside of the cylinder with a polymer base or primer comprising nylon 12. The base coat was approximately 0.005 inches to 0.008 inches in thickness and was applied at approximately 225° F. using a plasma spray gun. Next, a coating composition was prepared and applied to the test cylinder on top of the polymer base coat. The coating comprised 48% by weight nylon 12, 48% by weight purple cuprous oxide, and 4% by weight VANCIDE® 89 (captan). The coating was approximately 0.008 inches to 0.010 inches in thickness and was applied at approximately 240° F. using a plasma spray gun. Two glass cylinders and one carbon fiber cylinder were prepared in this way to create the test samples.

The test cylinder samples were tested in compliance with ASTM Standard Test Method D 6442-05 including the procedural guidelines for pH, salinity and temperature. The synthetic sea water was prepared according to ASTM D 1141-98, Section 6, and stored in two 100-L tanks (food-grade polyolefin) at 25±1° C. One tank was the sample holding tank and the other tank was the sea water supply tank. The synthetic sea water was continually pumped at 2 to 8 turnovers per hour through the tanks. The water was also passed through activated carbon filters and chelating resin filters to remove possible contaminants. The chelating resin was re-generated if copper levels neared or were found to exceed 100 µg/L.

The synthetic sea water was analyzed in the supply and sample holding tanks to monitor temperature, pH, and salinity within the ranges required by ASTM D 6442-05. The temperature was maintained between 24° C. to 26° C. The pH was maintained between 7.9 to 8.1 using NaOH or HCl as necessary. The salinity was maintained between 33 to 34 parts per thousand (as measured by a conductivity meter) by adding distilled water. The water was analyzed in the supply and sample holding tanks at each measurement interval to maintain copper content below 100 µg/L, as required by ASTM D 6442-05.

The test cylinders were removed from the holding tank on days 1, 3, 7, 10, 14, 21, 24, 28, 31, 35, 38, 42, 45, 49, 56, 63, 70, 77, 84 and 90 and exposed to 1500 mL of synthetic sea water at 25±1° C. The test cylinders were rotated in the sampling container at 60±5 rpm for 60 minutes. After the rotation period, 50 mL of the exposed synthetic seawater sample was placed in a plastic sample tube containing 50 µL of concentrated nitric acid and allowed to sit at least 10 minutes with occasional shaking. The synthetic seawater sample was filtered through a 0.45-µm nylon syringe filter into a plastic sample tube. Each tube was sealed in a bottle with a polyseal cap and refrigerated, as necessary, until extracted and analyzed.

The test cylinders were placed back in the holding tank of synthetic sea water until the next analysis interval. The sampling containers and laboratory glassware were thoroughly washed in deionized water and dilute HCl before reuse.

Copper standards were prepared and used to show linearity of the method over the range of interest and to determine the limit of detection of the method. A 50 mg/L standard was prepared by pipetting 5 mL of the 1000-mg/L copper standard into a 100-mL volumetric flask, adding 0.2 mL of $HNO_3$, and diluting to volume with deionized water. A 1000 µg/L standard was prepared by pipetting 4 mL of the 50 mg/L solution into another 200-mL volumetric flask, adding 0.2 mL of $HNO_3$, and diluting to volume with deionized water. A 50 µg/L standard was prepared by pipetting 5 mL of the 1000 µg/L standard into a 100-mL volumetric flask and diluted to volume with 10% $HNO_3$. Similar techniques were applied to create standards in the range from 0 µg/L to 70 µg/L.

Spikes in artificial sea water were prepared at a concentration similar to the test cylinder samples being extracted by pipetting 1, 5 and 20 mL of the 50-mg/L stock standard solution into separate 100-mL volumetric flasks, adding 0.1 mL of high-purity $HNO_3$, and diluted to volume with artificial sea water to 10 µg/L, 50 µg/L, and 200 µg/L, respectively.

Solid Phase Extraction (SPE) columns, which contained Chelex 100 resin, for each test sample were rinsed with 5 mL of deionized water. An appropriate volume of each test sample was added to produce a final concentration of copper between 0 and 100 µg/L. The dilution factor of this process equaled 10 mL divided by the sample volume. The samples were eluted twice with approximately 4.5 mL of 10% $HNO_3$ into 10-mL volumetric flasks. The flasks were removed and diluted to volume with 10% $HNO_3$.

The standards, spikes, a set of blank samples, and test samples were analyzed on a Varian 220 FS AA using a temperature and ramp sequence which included sample drying, ashing, atomization and tube clean-out, along with the typical AA operating conditions, shown in Table 1.

TABLE 1

| Mode | Graphite furnace |
|---|---|
| Wavelength | 324.8 nm |
| Slit | 0.5 nm |
| Signal Processing | Peak area |
| Replicates | 3 |
| Lamp Current | 4.0 mA |
| Background Correction | D2 |
| Sample Volume | 10 μL |
| Matrix Modifier | 10 μL of palladium/magnesium |

A blank sample and a 50-μg/L copper standard were analyzed before each test sample and the analysis results were used for calculating copper concentrations. The concentrations of copper were calculated using Equation 1:

$$C = \frac{(Area_{test\ sample} - Area_{blank})}{(Concentration_{standard})(Dilution\ Factor)} \quad \text{EQ. 1}$$
$$\frac{}{(Area_{standard} - Area_{blank})}$$

where C is the copper concentration of the test sample, given in μg/L, and the Dilution Factor is calculated as discussed above.

The release rate for each test cylinder sample was calculated using the Equation 2:

$$R = \frac{C \times V \times D}{T \times A} \quad \text{EQ. 2}$$

where R is the copper release rate, C is the concentration of copper as calculated in EQ. 1, V is the volume of the synthetic sea water in the measuring tank, D is the time, in hours, per day, T is the time, in hours, of the spin during sampling, and A is the area of the test cylinder sample coating. The volume, V, was a constant 1.5 L throughout the test. The time, D, was a constant 24 hours throughout the test. The area, A, was a constant 200 cm$^2$ throughout the test. The units of the release rate, R, are micrograms per square centimeter per day (μg/cm$^2$/day) which is a measure of the release of the mass of copper released per the area of the copper-based coating per day. The test results data for the coating 10 for the 90-day period is listed in Table 2.

the area of paint, which, for this test, is the area of the coating on the sample surface; and the spin time in hours. The next three rows are the calculated release rates, R, (from EQ. 2) for the three different samples—one carbon fiber cylinder, C, and two glass cylinder samples, H, J. The final row of the table is the average release rate of copper from the three samples with coating applied to them. The coating had an average release rate of 0.9 μg/cm$^2$/day for the period between day 21 and day 90, and by day 90 of the test, the coating had an average copper release rate of 0.3 μg/cm$^2$/day.

Thus, in certain embodiments according to the present invention, the coating has an average copper release rate of less than about 0.3 micrograms per square centimeter per day after 90 days as determined by ASTM D 6442-05. It will be appreciated that other metal-containing biocides may be used in lieu of the copper oxide. As not above, silver-containing biocides are also suitable for use with the present invention. In this case, the release (leach) rate of silver ions (or whichever metal ions are present in the biocide) from the coating composition is also on the order of less than about 0.3 micrograms per square centimeter per day after 90 days.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of applying a marine antifoulant coating to a surface of a marine vessel, said method comprising the steps of:

a) applying a local variable electric field to a heated blended mixture comprising a polymer, a marine biocide, and a preservative in a confined space and of a sufficient strength to alter the orientation of said polymer, said biocide, and said preservative relative to each other;

TABLE 2

| Study No. 3670-01: Summary of Results | | | | | | | | | | | | | | |
|---|---|---|---|---|---|---|---|---|---|---|---|---|---|---|
| Sample Point: | Day 1 | Day 7 | Day 14 | Day 21 | Day 28 | Day 35 | Day 42 | Day 49 | Day 56 | Day 63 | Day 70 | Day 77 | Day 84 | Day 90 |
| Area of Paint (cm$^2$): | 200 | 200 | 200 | 200 | 200 | 200 | 200 | 200 | 200 | 200 | 200 | 200 | 200 | 200 |
| Spin Time (hours): | 1 | 1 | 1 | 1 | 1 | 1 | 1 | 1 | 1 | 1 | 1 | 1 | 1 | 1 |
| C (μg/cm$^2$/day) | 37.5 | 13.7 | 2.6 | 2.2 | 1 | 2 | 0.8 | 0.8 | 0.7 | 1 | 1.4 | 0.5 | 0.5 | 0.4 |
| H (μg/cm$^2$/day) | 35.7 | 8.3 | 2.1 | 1.5 | 0.8 | 0.9 | 0.7 | 0.6 | 0.6 | 0.5 | 0.6 | 0.5 | 0.3 | 0.3 |
| J (μg/cm$^2$/day) | 42.6 | 14 | 4.1 | 1.9 | 1.1 | 1 | 0.7 | 1.1 | 0.8 | 0.6 | 0.5 | 0.5 | 0.5 | 0.3 |
| Avg. (μg/cm$^2$/day) | 38.6 | 12 | 2.9 | 1.9 | 1 | 1.3 | 0.7 | 0.8 | 0.7 | 0.7 | 0.8 | 0.5 | 0.4 | 0.3 |

The entries in column 1 of Table 2 list a portion of the data that was recorded for the test. The entries include the sample point, which is the relative day on which data was recorded;

b) injecting said heated blended mixture into a plasma stream after said local variable electric field has been applied;

c) enshrouding said plasma stream and heated blended mixture with a shielding gas to prevent contamination of said heated blended mixture; and d) directing said plasma stream and said heated blended mixture onto said marine vessel surface, whereby said heated blended mixture becomes adhered to said surface.

2. The method of claim 1, wherein said heated blended mixture comprises between about 40% to about 70% by weight of said polymer, between about 37% to about 52% by weight of said marine biocide, and between about 2% to about 12% by weight of said preservative.

3. The method of claim 1, wherein said variable electric field is applied to a chamber through which the mixture passes.

4. A method of forming and applying a marine antifoulant coating, the method comprising the steps of:

a) forming a blended mixture comprising particles of a polymer, a marine biocide, and a preservative;

b) heating said blended mixture to a temperature above the glass transition temperature of said polymer thereby forming a heated blended mixture comprising said polymer having particles of said biocide and preservative dispersed therein;

c) applying a local variable electric field to said heated blended mixture in a chamber through which said heated blended mixture passes and of a sufficient strength to alter the orientation of said polymer particles and said particles of biocide and preservative relative to each other;

d) injecting said heated blended mixture into a plasma stream after said local variable electric field has been applied;

e) enshrouding said plasma stream and heated blended mixture with a shielding gas to prevent contamination of said heated blended mixture; and f) directing said plasma stream and said heated blended mixture onto a marine vessel surface, whereby said heated blended mixture becomes adhered to said surface.

5. A method of forming and applying a marine antifoulant coating using a plasma spray gun apparatus, the method comprising the steps of:

a) forming a blended mixture comprising particles of a polymer, a marine biocide, and a preservative;

b) heating said blended mixture within said plasma spray gun apparatus to a temperature above the glass transition temperature of said polymer thereby forming a heated blended mixture comprising said polymer having particles of said biocide and preservative dispersed therein;

c) applying a local variable electric field to said heated blended mixture in a chamber within said plasma spray gun apparatus through which said heated blended mixture passes and of a sufficient strength to alter the orientation of said polymer particles and said particles of biocide and preservative relative to each other;

d) injecting said heated blended mixture into a plasma stream within said plasma spray gun apparatus after said local variable electric field has been applied;

e) enshrouding said plasma stream and heated blended mixture with a shielding gas to prevent contamination of said heated blended mixture as said heated blended mixture exits said plasma spray gun; and f) directing said plasma stream and said heated blended mixture onto a marine vessel surface, whereby said heated blended mixture becomes adhered to said surface.

* * * * *